United States Patent
Saiki et al.

(10) Patent No.: US 6,697,132 B2
(45) Date of Patent: Feb. 24, 2004

(54) OPTICAL MEMBER AND LIQUID CRYSTAL DISPLAY DEVICE

(75) Inventors: Yuuji Saiki, Ibaraki (JP); Masayuki Satake, Ibaraki (JP); Yasushi Takahashi, Ibaraki (JP); Takashi Shouda, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/997,869

(22) Filed: Nov. 27, 2001

(65) Prior Publication Data

US 2003/0098931 A1 May 29, 2003

(51) Int. Cl.[7] .......................... G02F 1/13; G02F 1/1335; G02F 1/1333
(52) U.S. Cl. ............................. 349/96; 349/122; 349/10
(58) Field of Search ............................. 349/96, 122, 10

(56) References Cited

U.S. PATENT DOCUMENTS 6,404,469 B1 * 6/2002 Kitagawa et al. ............. 349/96
2002/0015807 A1 * 2/2002 Sugino et al. ............. 428/1.31

* cited by examiner

*Primary Examiner*—Eddie Lee
*Assistant Examiner*—Joseph Nguyen
(74) *Attorney, Agent, or Firm*—Westerman, Hattori, Daniels & Adrian LLP

(57) ABSTRACT

An optical member comprising an optical material or a laminated body of the optical materials in a shape a sheet or a film and an adhesive layer at least on one side thereof, wherein a repulsive force when deformed at 180° in radius of 25 mm with 25 mm width shows 0.2 to 0.8 N, is used in a liquid crystal display. The optical member have a peeling strength may be decreased without decrease in adhesive strength of adhesive itself to enable easy formation of trigger for peeling.

11 Claims, 2 Drawing Sheets

OPTICAL MEMBER AND LIQUID CRYSTAL DISPLAY DEVICE

BACKGROUND OF THE INVENTION

1. Field of the Invention

The present invention relates to an optical member, such as a polarizing plate, that may be easily peeled off after being adhered by adhesive to liquid crystal cell etc. and a liquid crystal display with the optical member used therein.

2. Description of the Prior Art

In liquid crystal display (LCD), a constitution is generally used in which a polarizing plate, an elliptically polarizing plate, a polarizing plate with a compensating film, a polarizing plate with reflective/transflective layer, and a polarizing plate with a brightness enhanced film are laminated onto a liquid crystal cell through adhesive. In manufacturing method of such LCD, for the purpose of preventing of variation in quality, and of improving efficiency of LCD assembly line, etc., a method is used in which optical member is adhered onto a liquid crystal cell in a state where adhesive layer comprising acrylic derived adhesive etc. is applied beforehand thereon. In a process in which the optical members is adhered to liquid crystal cell, when a position where the optical member etc. is to be adhered shifts or foreign matters enter, the optical members, such as a polarizing plate, are peeled off from a liquid crystal cell, and panels, such as liquid crystal cell, are reused. In that case, first, a part of the optical member is peeled off with edge tool etc. from a corner portion, a trigger for peeling is prepared and then the whole optical member is peeled off gradually from the portion.

However, in that case a difficulty in preparation of a trigger and a large amount of peeling strength in subsequent peeling process worsen workability. Moreover, if a very large peeling strength, there is a possible problem to change cell gaps of a liquid crystal cell, and of reducing display quality or damaging panels.

Alternatively, although adhesives with a low-adhesive strength raise a peeling property, these low-strength adhesives induce a problem that peeling of a polarizing plate adhered to a liquid crystal cell is caused after a durability examination of heating, humidification, etc. Thus, it was difficult to be compatible in peeling property and durability.

Therefore, an object of the present invention is to provide an optical member in which strength required for peeling may be reduced without decreasing adhesive strength of the adhesives and in which a trigger for peeling is easily prepared. And an other object of the present invention is to provide a liquid crystal display using said optical member

SUMMARY OF THE INVENTION

The present inventors wholeheartedly carried out research that the above-mentioned object should be attained. It was found by the present inventors that in case of peeling, as stiffness of peeling an optical member is stronger, a peeling strength (adhesive strength) becomes smaller, but when the stiffness is too strong, a preparation of a trigger for peeling becomes difficult and as a result workability is impaired. And thus the present invention was completed.

That is, an optical member of the present invention is an optical member comprising an optical material or a laminated body of the optical materials in a shape a sheet or a film and an adhesive layer at least on one side thereof, wherein a repulsive force of the optical member deformed at 180° in radius of 25 mm with 25 mm width shows 0.2 to 0.8 N. Usually the deformation is carried out in a shape of a semicircle deformed at 180° in radius of 25 mm with 25 mm width, the form of deformation is not strictly limited in the shape of a semicircle, but a case maybe permitted where curvature is locally different from other portion or an error on work exists.

In the above-mentioned optical member, it is preferable that the optical material or a laminated body of the optical material is a polarizing plate, a reflection type polarizing plate, a transflective layer type polarizing plate, or a polarized light separation polarizing plate or a laminated body obtained by laminating a retardation plate with each of the above-mentioned polarizing plate.

On the other hand, a liquid crystal display of the present invention comprising at least one above-mentioned optical member is adhered on a liquid crystal cell.

EFFECT OF THE INVENTION

Since repulsive force shows 0.2 to 0.8 N in an optical member of the present invention when deformed at 180° in radius of 25 mm with 25 mm width, as results of Example show, a strength required for peeling may be decreased without decrease in adhesive strength of adhesive itself to enable easy formation of trigger for peeling. When the repulsive force is less than 0.2 N, an effect becomes inadequate in making a strength required for peeling reduced to impair workability, and on the contrary, if the repulsive force exceeds 0.8 N, it will be hard to prepare a trigger for peeling and workability will also be impaired.

In a case the material or a laminated body of the optical materials is a polarizing plate, a reflection type polarizing plate, a transflective layer type polarizing plate, or a polarized light separating polarizing plate or a laminated body obtained by laminating a retardation plate with each of the above-mentioned polarizing plates, when each of the plated is adhered onto a liquid crystal cell etc. through an adhesive layer, a problem of the above-mentioned peeling may occur during work. Therefore, the present invention providing the above-mentioned function and effect will become especially useful.

On the other hand, since at least one optical member having the above-mentioned function and effect is adhered onto a liquid crystal cell in a liquid crystal display of the present invention, in the case where the optical member is peeled off from the liquid crystal cell, a strength required for peeling may be decreased without decrease in adhesive strength of adhesive itself to enable easy preparation of a trigger for peeling.

DETAILED DESCRIPTION OF THE INVENTION

Hereinafter, embodiments of the present invention will be described, referring to drawings.

Figure 1:
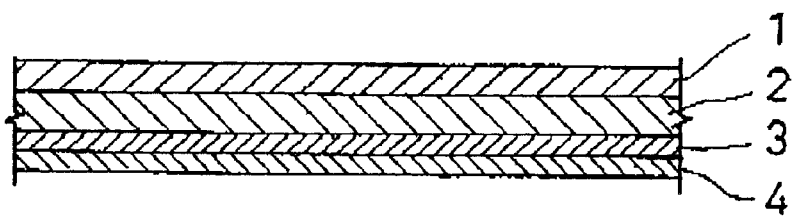
FIG. 1 is a sectional drawing showing an example of an optical member of the present invention.
Figure 2:
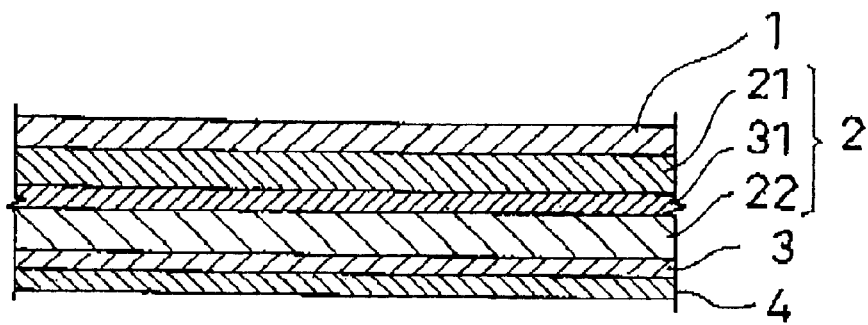
FIG. 2 is a sectional drawing showing another example of an optical member of the present invention.

An optical member of the present invention is an optical member that has an adhesive layer on at least one side of the optical material or a laminated body of the optical materials in a shape of a sheet or a film. The examples are shown in FIGS. 1 and 2. In an optical member shown in FIG. 1, a protective film 1 is prepared on upper surface side of an optical material 2 and an adhesive layer 3 is prepared on under surface side, and further a separator 4 is disposed. Moreover, in an optical member shown in FIG. 2, an optical material 2 shown in FIG. 1 is formed by an elliptically polarizing plate in which a polarizing plate 21 and a retardation plate 22 are laminated through an adhesive layer 31. A protective film 1 is prepared on upper surface side of the elliptically polarizing plate, and an adhesive layer 3 is prepared on under surface side, and further a separator 4 is disposed.

An optical member of the present invention is the above-mentioned optical member, having a repulsive force when deformed at 180° in radius of 25 mm with 25 mm width is 0.2 to 0.8 N, and preferably 0.25 to 0.70 N. In addition, a measuring method of the repulsive force is shown in Example.

As the above-mentioned optical material and laminated body of the optical material, a polarizing plate, a reflection type polarizing plate, a transflective layer type polarizing plate, or a polarized light separating polarizing plate are laminated or a laminated body obtained by laminating a retardation plate with each of the above-mentioned polarizing plates is preferable. The above-mentioned optical material and laminated body of the optical material is not particularly not limited only various polarizing plates but filters, touch panels, compensating plate, reflective plate, transflective plate, diffusion film, etc. may be usable. In addition, in laminated bodies, proper adhesion means, such as adhesive layer of the present invention and other adhesive layer, may be used for laminating.

Examples of the polarizing plate include a polarizing film obtained by allowing a dichroic substance such as iodine or a dye to be adsorbed onto a hydrophilic polymer film such as a polyvinyl alcohol series film, partially formalized polyvinyl alcohol series film, ethylene/vinyl acetate copolymer series partially saponified film, and stretching the film; or a polyene oriented film such as a dehydrated product of polyvinyl alcohol or a dehydrochlorinated product of polyvinyl chloride. A thickness of the polarizing plate is preferably 100 to 300 μm to attain the above-mentioned repulsive force.

On the other hand, the reflecting type polarizing plate is for forming a liquid crystal display or the like of a type such that the incident light from the viewing side (display side) is reflected for display. This has an advantage in that the incorporation of a light source such as a backlight can be omitted to facilitate fabrication of a liquid crystal display having a reduced thickness. The reflecting type polarizing plate may be formed by a suitable method such as a method of attaching a reflecting layer made of metal or the like onto one surface of a polarizing film, optionally via a transparent protective layer or the like. A protective film 1 may also serve as the above-mentioned polarizing plate and especially a transparent resin layer prepared in one side or both sides of a polarizing film.

A specific example of the reflecting type polarizing plate may be one in which a foil or a vapor-deposited film made of a reflecting metal such as aluminum is attached onto one surface of a transparent protective layer made of an optionally matted film or the like. The reflecting type polarizing plate may be one having a reflecting layer of a fine undulating structure on the aforesaid diffusing type transparent protective layer. The reflecting layer is preferably used in a state in which the reflecting surface thereof is covered with a transparent protective film, a polarizing plate, or the like, in view of preventing decrease in the reflectivity caused by oxidation, hence long-term duration of initial reflectivity, avoidance of separately attaching a protective layer, and other reasons.

The aforesaid reflecting layer having a fine undulating structure has advantages such as preventing directivity or glittering appearance by diffusing the incident light by random reflection, thereby restraining the unevenness of brightness. Also, the transparent protective layer containing fine particles has such an advantage that the incident light and the reflected light thereof are diffused while passing therethrough, whereby the unevenness of brightness and darkness can be further restrained. The reflecting layer of a fine undulating structure reflecting the surface fine undulating structure of the transparent protective layer can be formed, for example, by attaching metal directly onto the surface of a transparent protective layer with the use of a suitable method of vapor deposition type such as the vacuum vapor deposition method, the ion plating method, or the sputtering method or plating type or the like.

The protective film or the transparent protective layer may be made of polymers, excellent in transparency, mechanical strength, thermal stability, moisture shielding property, isotropic property, and others. The polymers include, for example, polyester, cellulose acetate, polyethersulfone, polycarbonate, polyamide, polyimide, polyolefin, or acrylic resin or thermosetting or ultraviolet-curing resin such as acryl series, urethane series, acrylurethane series, epoxy series, or silicone series, or the like.

The transparent protective layer may be formed by a suitable method such as a method of coating a polymer or a method of laminating those made into films, and the thickness thereof may be suitably determined. The thickness is typically at most 500 μm, preferably from 1 to 300 μm, more preferably from 5 to 200 μm. The fine particles to be contained in the aforesaid transparent protective film may be, for example, suitable transparent particles such as inorganic fine particles made of silica, alumina, titania, zirconia, tin oxide, indium oxide, cadmium oxide, antimony oxide, or the like having an average particle size of from 0.5 to 20 μm, which may be electrically conductive, or organic fine particles made of a cross-linked or non-cross-linked polymer or the like. The amount of fine particles to be used is typically from 2 to 25 parts by weight, preferably from 5 to 20 parts by weight, with respect to 100 parts by weight of the transparent resin.

Meanwhile, specific examples of the aforesaid retardation plate include birefringent films obtained by stretching a film made of a suitable polymer such as polycarbonate, polyvinyl alcohol, polystyrene, polymethyl methacrylate, polyolefin such as polypropylene, polyallylate, or polyamide, oriented film of liquid crystal polymer. The retardation plate may be made of a laminate of two more thereof to control optical property such as phase difference. A thickness of the retardation plate is preferably 50 to 200 μm to attain the above-mentioned repulsive force.

Moreover, a plate in which a polarizing plate or reflection type polarizing plate, and a retardation plate are laminated in proper combination develops a function as an elliptically polarizing plate or a reflected type elliptical polarizing plate. In manufacturing process of a liquid crystal display, this elliptically polarizing plate etc. may also be manufactured by laminating those plates separately one by one so that a combination of a polarizing plate (reflected type) and a retardation plate may be realized, as is described above. The plate combined beforehand as an elliptically polarizing plate etc. may develop stable quality and may be excellent in workability in laminating process etc., and moreover has an advantage in outstanding manufacturing efficiency of a liquid crystal display. In addition, a circular polarizing plate may also be used depending on type of retardation plate.

A transflective layer type polarizing plate is a polarizing plate in which a reflective layer of reflection type polarization plate is changed into a transflective type reflective layer. If this transflective layer type polarizing plate is used, a liquid crystal display maybe recognized by viewing, in sunlight etc., in a reflective mode, that is, in a state of the backlight put off, and at night or in a darkroom, in a transparent mode, that is, in a state of the backlight turned on, by configuring the transflective type reflective layer through a polarizing plate on a backlight side of a liquid crystal cell with a backlight.

As a polarized light separating plate, following suitable plate maybe used; for example, a layer that shows a characteristic of transmitting a linear polarized light with a predetermined polarization axis and reflecting other light, such as a multilayer thin film of dielectrics, or a multilayer laminated material of thin films having different refractive indexes anisotropy; as well as, a layer that shows a characteristic of reflecting circularly polarized light of either left-handed rotation or right-handed rotation, and transmitting other light, such as a layer in which a cholesteric liquid crystal layer, especially an orientated film of a cholesteric liquid crystal polymer, and its orientated liquid crystal layer are supported on a film substrate.

In the aforesaid polarized light separating plate of a type that transmits a linearly polarized light of a predetermined polarizing axis, the light can be efficiently transmitted while restraining the absorption loss by the polarizing plate, by allowing the transmitted light to be incident, as it is, into the polarizing plate with aligned polarized axis. On the other hand, in the polarized light separating plate of a type that transmits a circular polarized light, such as a cholesteric liquid crystal layer, it is preferable to allow the light to be incident into the polarizing plate after converting the transmitted circular polarized light into a linearly polarized light via a retardation plate instead of allowing the light to be incident, as it is, into the polarizing plate to restrain the absorption loss. The circular polarized light can be converted into a linearly polarized light by using a quarter wavelength plate as the retardation plate.

A retardation plate that functions as a quarter wavelength plate in a wide wavelength range such as a visible light region can be obtained by a method such as superposing a retardation layer that functions as a quarter wavelength plate to a monochroic light such as a 550 nm wavelength light, onto a retardation layer that shows a different retardation characteristics, for example, a retardation layer that functions as a half wavelength plate. Therefore, the retardation plate to be disposed between the polarizing plate and the polarized light separating plate may be made of one or more layers of retardation layers.

Also, as to the cholesteric liquid crystal layer, one can obtain a layer that reflects a circular polarized light in a wide wavelength range such as a visible light region by providing a configuration structure in which two or more layers are superposed using a combination of layers having different reflection wavelengths.

An adhesive layer prepared at least on one side of an optical material may just show a usual adhesive strength to a subject to be adhered, such as a substrate of a liquid crystal cell. Specifically the adhesive strength is preferably in a range of 2 to 15 N/25 mm obtained as follows; after the adhesive layer is applied onto a glass plate and then heated in an autoclave under conditions of at 50° C. for 15 minutes and 0.49 MPa, measuring is carried out at an angle of 180°, at tension speed of 300 mm/min. When adhered especially onto a glass substrate of a liquid crystal cell, a range of adhesive strength is preferably 2 to 15 N/25 mm.

The adhesive substance or adhesive agent forming the adhesive layer, is no particular limited, can used a suitable one. An example thereof is an adhesive containing a suitable polymer such as an acryl series polymer, a silicone series polymer, polyester, polyurethane, polyamide, polyether, or rubber series polymer, as a base polymer. Above all, adhesive may be preferably used that have an outstanding optical transparency and demonstrate an adhesive characteristics with moderate wettability, cohesiveness, and adhesive property, and moreover excellent weatherability and heat resistance, such as acrylic derived adhesive.

Moreover, in addition, adhesive layer whose rate of moisture absorption is low and having an excellent heat resistance are preferable, in order to prevent a foaming phenomenon, a peeling phenomenon caused by moisture absorption, a decrease in optical property and a curvature of a liquid crystal cell by thermal expansion difference etc., and in order to manufacture a liquid crystal display excellent in durability with high quality.

The adhesive layer may comprise, suitable additives such as natural and synthetic resins, glass fibers, glass beads, fillers and pigments made of metal powders, other inorganic powders, and the like, coloring agents, and antioxidants, which can be blended in accordance with the needs. Further, an adhesive layer exhibiting an optical diffusion property can be made by allowing fine particles to be contained therein.

The adhesive layer can be attached onto the optical material by a suitable method. Examples of the method include a method of preparing an adhesive solution of from 10 to 40 wt % by dissolving or dispersing an adhesive substance or a composition thereof into a solvent made of a single one or a mixture of suitable solvents such as toluene and ethyl acetate, and attaching the adhesive solution directly onto the optical material by a suitable developing method such as the casting method or the application method, and a method of forming an adhesive layer on a separator in accordance with the above and transferring the adhesive layer onto the optical material.

The adhesive layer can also be provided on the optical material as superposed layers of those of different compositions, those of different kinds, or the like. The thickness of the adhesive layer can be suitably determined in accordance with the intended usage or the adhesive strength, and is typically from 1 to 500 $\mu$m. It is preferable that a covering protection of the surface with a separator 4 etc., as shown in Figure, may be given until it is practically used, when the adhesive layer is possibly exposed to a surface.

The polarizing plate, the retardation plate, the protective film, the adhesive layer or the adhesive layer constituting the optical member may be allowed to have an ultraviolet absorbing capability by a method of treating with a ultraviolet absorber such as a salicylic acid ester series compound, a benzophenol series compound, a benzotriazol series compound, a cyanoacrylate series compound, or a nickel complex salt series compound.

An optical member of the present invention may be adhered onto proper members, such as a liquid crystal cell and a CRT, through an adhesive layer. It is preferable to be used for a liquid crystal display of the present invention, i.e., a liquid crystal display on which at least one above-mentioned optical member is adhered onto a liquid crystal cell.

A liquid crystal cell usually comprises a structure in which a liquid crystal layer intervenes between glass substrates or resin substrates. And a cell substrate is further equipped with a coated layer, a transparent electric conductive film, etc. The adhesive layers are adhered to them.

As a glass substrate, soda lime glasses, low alkali glasses, non-alkali glasses, silica glasses, etc. may be mentioned. Moreover, although resin substrates may be formed of proper resins, such as thermoplastic resins and thermosetting resins, when heat resistance, at time of transparent electric conductive film being attached, is taken into consideration, resin substrates which may be preferably used comprise resins having a glass transition temperature of not less than 130° C., and more preferably of not less than 150° C., and especially preferably of not less than 160° C.

Moreover, resin substrates preferably have an outstanding transparency and shock resistance, and it is preferable that optical transmittance shows not less than 80%. Furthermore, in order to prevent deterioration of liquid crystal, and to provide a durability as a liquid crystal cell, it is preferable to show an outstanding chemical resistance, an optical isotropy, and a low water absorbing property and a low moisture vapor permeability, and at the same time to have an excellent gas barrier property, such as to oxygen.

As examples of resins that form resin substrates, thermoplastic resins, such as polycarbonates, polyallylates, polyether sulfones, polyestesr, poly sulfones, poly methylmethacrylates, polyether imides, and polyamides; thermosetting resins, such as epoxy derived resins, unsaturated polyesters, and poly diallyl phthalate and poly isobornyl methacrylate may be mentioned.

Figure 3:
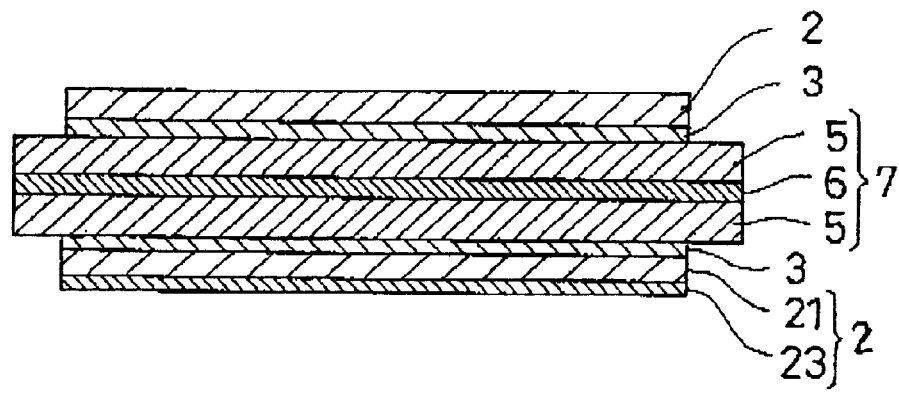
FIG. 3 is a sectional drawing showing an example of a liquid crystal display of the present invention.

A manufacturing of a liquid crystal cell may be performed by a method in which cell substrates that is given a patternized electrode on the above-mentioned transparent electric conductive film are configured face to face, and between them liquid crystal is enclosed. An example is shown in FIG. 3. Reference number 7 represents a liquid crystal cell, and number 6 the liquid crystal layer. An orientation film prepared for aligning liquid crystal, if needed, on a transparent electric conductive film may be configured using a method similar to conventional method. Liquid crystal cells to be formed may arbitrarily be of TN type, STN type, TFT type, ferroelectric liquid crystal type etc.

A liquid crystal display of the present invention may be manufactured as a liquid crystal display in which optical members of the present invention are adhered on one side or both sides of a liquid crystal cell through adhesive layers. An example is shown in FIG. 3. In addition, an equipment illustrated in FIG. 3 is a reflected type equipment in which a polarizing plate 21 is prepared having a reflective layer 23 on a backside of a viewing side of a liquid crystal cell 7.

In manufacturing of a liquid crystal display, after forming a liquid crystal cell, optical members may just be adhered to the cell. In adhesion step, a polarizing plate, a retardation plate, etc. are configured in a predetermined position, and the position configured may be based on conventional method.

EXAMPLES

Hereinafter, Example showing a constitution and an effect of the present invention concretely will be described.

Example 1

After a polyvinyl alcohol film with a thickness of 80 μm was stretched five times in iodine aqueous solution, and then dried. Cellulose triacetate films (transparent resin layer) with a thickness of 80 μm were adhered through adhesives onto both sides of this film, and polarizing plate was obtained. An acrylic derived adhesive in 25 μm thickness was applied to one side of the polarizing plate, and thus an adhesive polarizing plate was obtained, and it was used as examination sample.

Example 2

A polycarbonate film with a thickness of 60 μm was stretched under 160° C. atmosphere, and a retardation plate was obtained. An acrylic derived adhesive in 25 μm thickness was applied to one side of the retardation plate obtained, and adhesive retardation plate was obtained. The same method as in Example 1 was adopted except that an elliptically polarizing plate in which two of the retardation plates were laminated to the polarizing plate prepared in Example 1 was used.

Comparative Example 1

A polycarbonate film with a thickness of 60 μm was stretched under 160° C. atmosphere, and a retardation plate was obtained. An acrylic derived adhesive in 25 μm thickness was applied onto one side of the retardation plate, and an adhesive retardation plate was obtained. The same method as in Example 1 was adopted except that this tacky adhesive retardation plate was used as an examination sample.

Comparative Example 2

The same method as Example 1 was adopted except that cellulose triacetate films (transparent resin layer) with a thickness of 190 μm were adhered onto both sides of the polarizing plate through adhesives, and a polarizing plate was obtained.

Evaluation Examination

Figure 4:
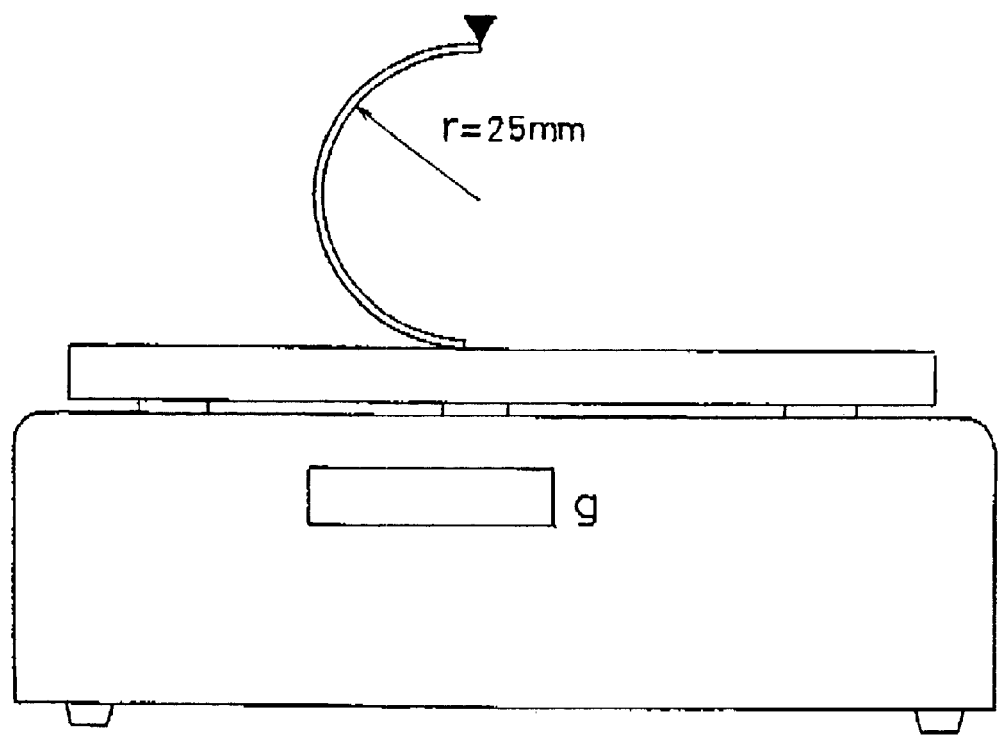
FIG. 4 is a front view describing a measuring method of a repulsive force of an optical member.

Examination sample was cut into 25 mm width, and as shown in FIG. 4, a repulsive force when deformed at 180° in radius of 25 mm was measured using an electronic balance.

Examination sample was cut into 25 mm width, adhered onto a glass plate and the sample was then heated in an autoclave under conditions of at 50° C. for 15 minutes and 0.49 MPa. The adhesive strength of the sample was measured at the angle of 180° at tension speed of 300 mm/min. using a tensile testing machine.

Examination sample was cut into a size of 300 mm×200 mm, and is adhered onto a glass plate of 0.7 mm thickness. This sample was peeled at a corner part from the glass plate. Test was carried out 10 times. It was examined whether problems in workability, such as a large amount of peeling strength required and difficulty to make a trigger, were observed or not. These results are shown in Table 1.

TABLE 1

|  | 180° repulsive force (N/25 mm) | Adhesive strength (N/25 mm) | Workability |
|---|---|---|---|
| Example 1 | 0.28 | 7.8 | Good |
| Example 2 | 0.62 | 5.6 | Good |
| Comparative Example 1 | 0.08 | 13.8 | A large amount of peeling strength required and difficult to make a trigger for peeling |
| Comparative Example 2 | 1.00 | 5.0 | |

Based on a comparison between Example and Comparative example, in an optical material that has a form of a sheet and a film, peeling may be carried out without a large amount of peeling strength and a trigger for peeling may be made easily when a repulsive force at the time of deformation at 180° in radius of 25 mm with 25 mm width is 0.2 to 0.8 N, and as a result an excellent peeling property of the optical member may be obtained.

What is claimed is:

1. An optical member comprising an optical material or a laminated body of optical materials, said optical material or laminated body being in a shape of a sheet or a film, and an adhesive layer at least on one side thereof, wherein a repulsive force of the optical member deformed at 180° in radius of 25 mm with 25 mm width shows 0.2 to 0.8 N.

2. The optical member according to claim 1, wherein the optical material or the laminated body of the optical materials is a polarizing plate, a reflection type polarizing plate, a transflective layer type polarizing plate, a polarized light separating polarizing plate, or a laminated body obtained by laminating a retardation plate with any of the polarizing plates.

3. A liquid crystal display comprising at least one of the optical members according to claim 1 adhered on a liquid crystal cell.

4. The optical member according to claim 1, wherein the repulsive force is 0.25 to 0.75 N.

5. The optical member according to claim 1, wherein an adhesive strength of the adhesive is 2 to 15 N/25 mm.

6. The optical member according to claim 2, wherein an adhesive strength of the adhesive is 2 to 15 N/25 mm.

7. A liquid crystal display comprising at least one of the optical members according to claim 2 adhered on a liquid crystal cell.

8. A liquid crystal display comprising at least one of the optical members according to claim 4 adhered on a liquid crystal cell.

9. A liquid crystal display comprising at least one of the optical members according to claim 5 adhered on a liquid crystal cell.

10. A liquid crystal display comprising at least one of the optical members according to claim 6 adhered on a liquid crystal cell.

11. A liquid crystal display comprising at least one of the optical members according to claim 7 adhered on a liquid crystal cell.

* * * * *